United States Patent [19]
Ferguson

[11] Patent Number: 5,894,413
[45] Date of Patent: Apr. 13, 1999

[54] REDUNDANT POWER SUPPLY SWITCHOVER CIRCUIT

[75] Inventor: Bruce R. Ferguson, Anaheim, Calif.

[73] Assignees: Sony Corporation, Tokyo, Japan; Sony Trans Com Inc., Irvine, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/789,882

[22] Filed: Jan. 28, 1997

[51] Int. Cl.$^6$ .................. H02M 7/00; H02J 1/00; H02J 7/00
[52] U.S. Cl. .................. 363/65; 363/65; 363/67; 307/66; 307/43
[58] Field of Search .................. 363/65, 67; 307/43, 307/44, 65, 66, 64, 82, 48, 80, 85

[56] References Cited

U.S. PATENT DOCUMENTS

| | | | |
|---|---|---|---|
| 3,641,570 | 2/1972 | Thompson | 307/65 |
| 3,748,500 | 7/1973 | Tam | 307/71 |
| 3,912,940 | 10/1975 | Vince | 307/64 |
| 4,035,716 | 7/1977 | Hutchingson | 323/81 |
| 4,075,502 | 2/1978 | Walley, Jr. | 307/64 |
| 4,315,162 | 2/1982 | Ferguson | 307/66 |
| 4,356,403 | 10/1982 | Mohat | 307/60 |
| 4,628,433 | 12/1986 | Notohamiprojo | 363/65 |
| 4,651,020 | 3/1987 | Kenny et al. | 307/44 |
| 5,465,011 | 11/1995 | Miller et al. | 363/34 |
| 5,598,041 | 1/1997 | Willis | 307/43 |
| 5,659,208 | 8/1997 | Kimble et al. | 307/82 |

OTHER PUBLICATIONS

"ASTEC—The Supplier of Choice—AMPSS Application Notes," Jan. 1996.

Primary Examiner—Peter S. Wong
Assistant Examiner—Bao Q. Vu
Attorney, Agent, or Firm—Blakely, Sokoloff, Taylor & Zafman LLP

[57] ABSTRACT

The present invention is a method and apparatus for providing a power supply system having a redundant power supply switchover circuit, which maintains a remotely regulated output voltage when the power supply system switches over from the primary power supply to the secondary power supply. The power supply system comprises a secondary power supply that is connected in parallel to a primary power supply. The two power supplies are OR-connected to a load through two diodes, with the primary power supply connected to the diode via a monitor. During normal operating conditions, the primary power supply delivers most of the current because it operates in a "remote sense" configuration which provides a voltage output that is higher, by a diode voltage drop, than that of the secondary power supply, which operates in a "local sense" configuration. When a monitor detects the failure of the primary power supply, it generates a control signal to direct a relay switch to switch the secondary power supply from the "local sense" configuration to the "remote sense" configuration. As a result, the secondary power supply will deliver the full power requirements of the load. During the momentary switchover period, fluctuations in load voltage are minimal and within the range permitted by most logic devices.

30 Claims, 4 Drawing Sheets

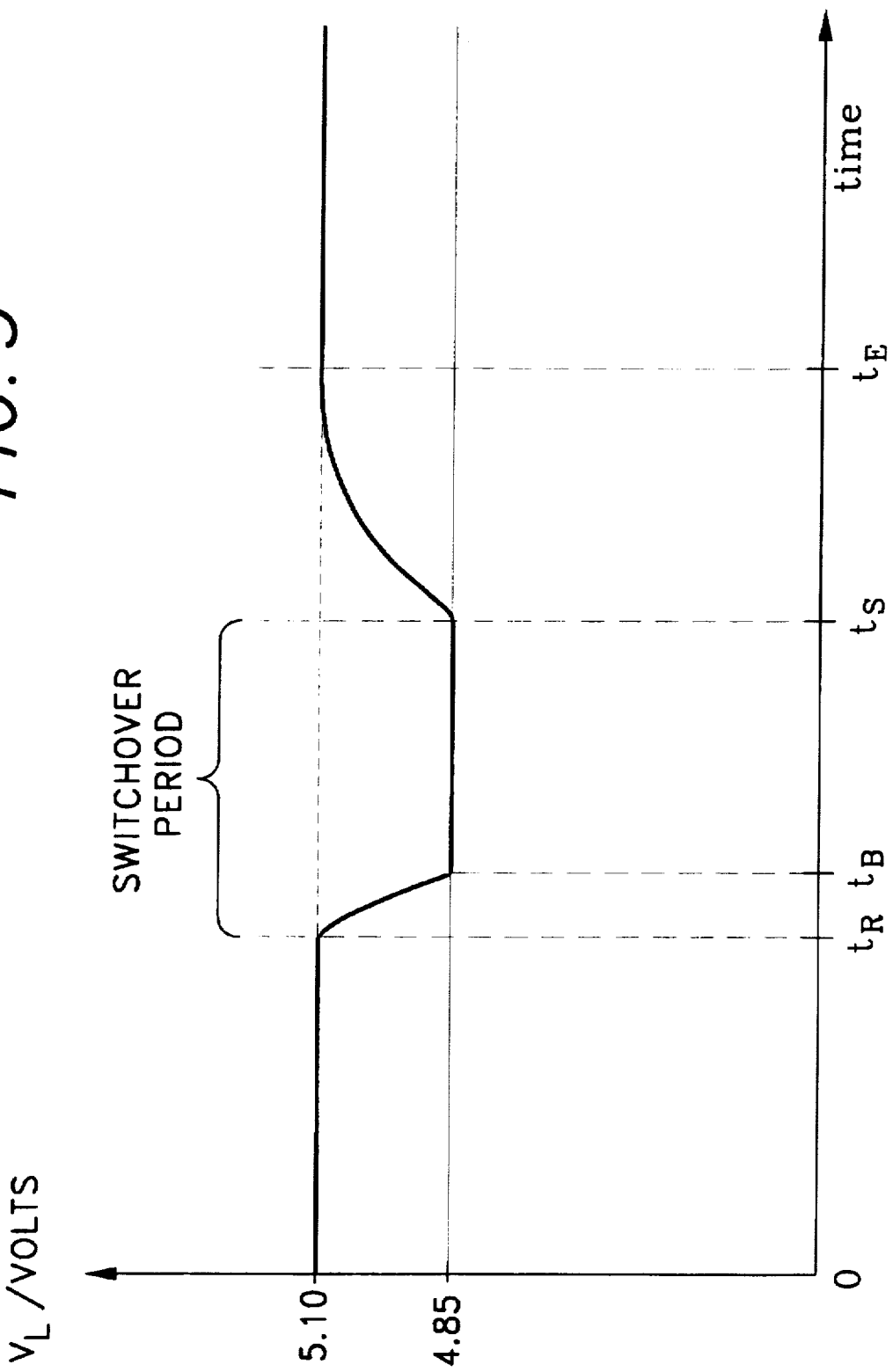

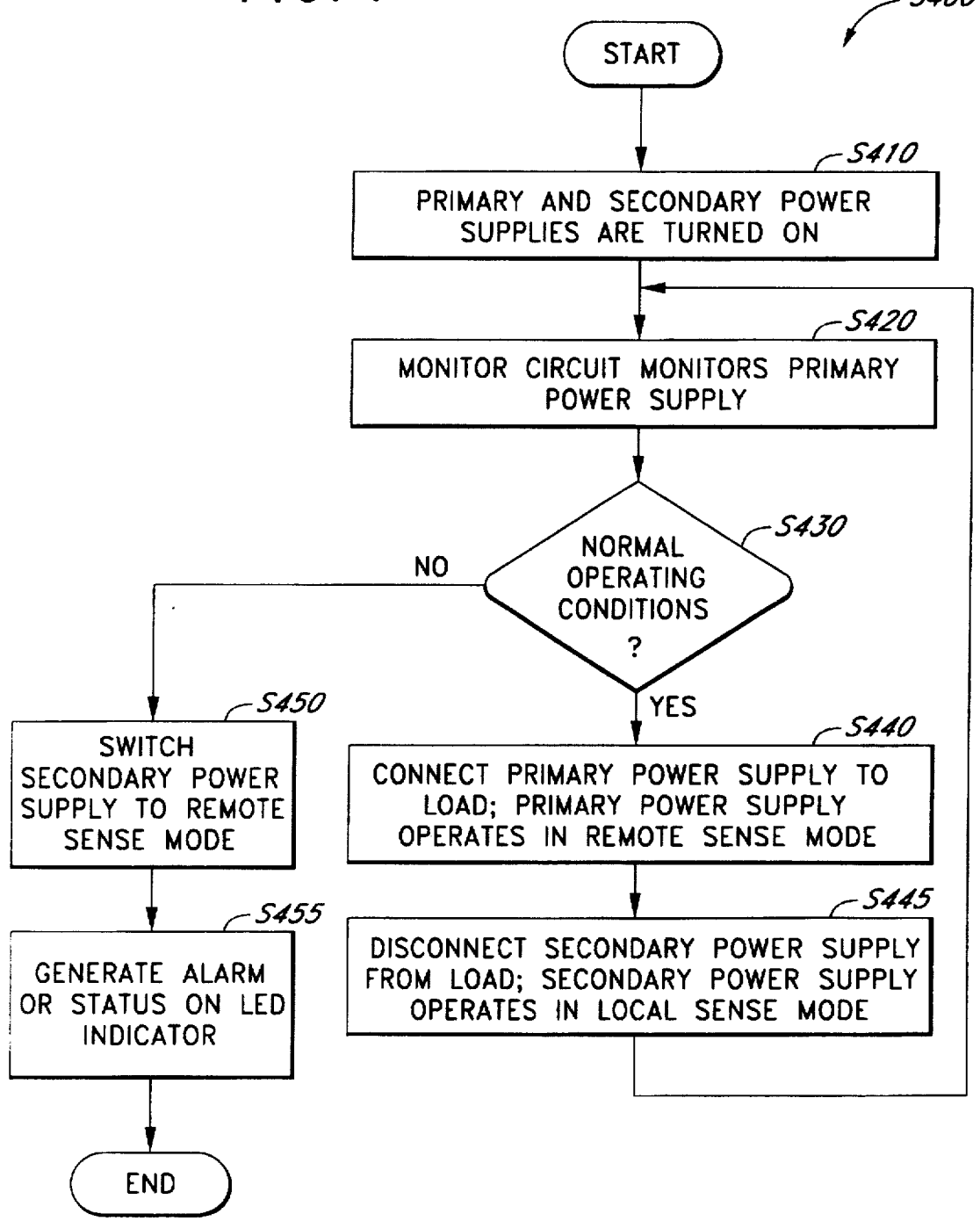

ved power supply system of the prior art.

REDUNDANT POWER SUPPLY SWITCHOVER CIRCUIT

BACKGROUND OF THE INVENTION

1. Field of the Invention

The present invention relates to power supplies, and more particularly, to a method and apparatus of providing a power supply system having a redundant power supply switchover circuit, which maintains a remotely regulated output voltage when the power supply system switches over from the primary power supply to the secondary power supply. The present invention is particularly applicable to in-flight entertainment systems.

2. Description of the Related Art

Over the past few decades, commercial aircraft has become a necessary mode of travel for personal and business reasons. To improve passenger comfort, commercial aircraft typically offer a number of entertainment activities that can be enjoyed by the passenger, such as video games, movies and various selections of music. In addition, various electronic systems for supporting communications and/or other in-flight functions are provided.

In such in-flight entertainment systems, loss of power typically results in the interruption of the in-flight entertainment services. To avoid such interruption in services, backup or secondary power supplies are generally provided. Thus, if one power supply fails, the redundancy in the power supply system allows the other power supply to continue to supply power to the electronic components in the electronics system without interruption in service.

There are typically two types of redundant power supply systems. In the first, which is generally known as the cold standby mode, the backup or secondary power supply is not energized. The secondary power supply is energized only when the primary or main power supply fails. One disadvantage in using such a cold standby mode includes the temporary unavailability of services, since the power supply system requires a period of time to switch over to the secondary power supply. The advantage of such a cold standby mode includes extended life for the secondary power supply.

In the second type of redundant power supply system, generally known as the hot standby mode, both the primary and the secondary power supplies are energized at the same time. As a result, both the primary and the secondary power supplies contribute power to the load. In the event that the primary power supply fails, the secondary power supply will immediately become available to supply power to the load. The advantage of such a hot standby mode includes the provision of uninterrupted services while the disadvantage includes reduced life of the secondary power supply.

In most in-flight entertainment systems, the provision of uninterrupted services is a highly desirable feature. As a result, the hot standby mode is typically used in these systems despite the reduced life expectancy of the secondary power supply. A typical configuration for providing such a redundancy in power supply systems using a hot standby mode, is to OR the outputs of the power supplies 12 and 14 through a pair of diodes 16 and 18, as shown in FIG. 1. The diodes 16 and 18 are connected so that the cathode (i.e. positive terminal) of each diode 16 or 18 is connected to one terminal of the load 20, while the anode (i.e. negative terminal) of each diode 16 or 18 is connected to the positive output terminal of each of the power supplies 12 and 14. The other terminal of the load 20 is connected to the negative output terminal of each of the power supplies 12 and 14. In this configuration, either power supply 12 or 14 is capable of delivering full power to the load 20. Remote sense lines 22 and 24 coupled to each power supply 12 and 14 respectively, allow each power supply 12 and 14 to regulate the voltage across the load 20 and account for the voltage drop across the diodes 16 and 18.

A significant problem with this configuration, as discussed earlier, is that, under normal operating conditions, the load 20 draws power from both power supplies 12 and 14. Over an extended period of time, this subjects both power supplies 12 and 14 to operational stress. As a result, either or both of the power supplies 12 and/or 14 have to be replaced frequently. In addition, since both power supplies 12 and 4 are equally stressed, the possibility of a single failure point, that is, the failure of both power supplies 12 and 14, increases, thus reducing the reliability of the electronics system which utilizes the power supplies 12 and 14.

Accordingly, there is a need in the technology for an apparatus and method for providing a redundant power supply redundancy which offers the advantages of both a hot standby mode and a cold standby mode, such as the provision of uninterrupted services, while imposing little stress on the secondary power supply, so that the life expectancy of the secondary power supply will be extended. There is also a need in the technology for a redundant power supply which provides backup power in a very short period of time, while ensuring that power supply voltage fluctuations are within the operating range of the load during the switchover period.

BRIEF SUMMARY OF THE INVENTION

The present invention is a method and apparatus for providing a redundant power supply system which simultaneously energizes both the primary and the secondary power supplies so that there will be no interruption of power when the primary power supply fails. Although both the primary and secondary power supplies are energized in the normal operating mode, only the primary power supply is subject to the operating stress of the load. Thus, in the normal mode, although the secondary power supply is energized, it is not subject to the operating stress of the load.

The power supply system has a redundant power supply switchover circuit, which maintains a remotely regulated output voltage when the power supply system switches over from the primary power supply to the secondary power supply. The power supply system comprises a secondary power supply that is connected in parallel to a primary power supply. The two power supplies are OR-connected to a load through two diodes, with the primary power supply connected to the diode via a monitor. During normal operating conditions, the primary power supply delivers most of the current because it operates in a "remote sense" configuration which provides a voltage output that is higher, by a diode voltage drop, than that of the secondary power supply, which operates in a "local sense" configuration. When a monitor detects the failure of the primary power supply, it generates a control signal to direct a relay switch to switch the secondary power supply from the "local sense" configuration to the "remote sense" configuration. As a result, the secondary power supply will deliver the full power requirements of the load. During the momentary switchover period, fluctuations in load voltage are minimal and within the range permitted by most logic devices.

BRIEF DESCRIPTION OF THE DRAWINGS

FIG. 3 is a timing diagram illustrating the voltage level of the redundant power supply of FIG. 2 as a function of time.

FIG. 4 is a flow diagram illustrating the process of the switching of the redundant power supplies.

DETAILED DESCRIPTION OF THE INVENTION

Figure 1:
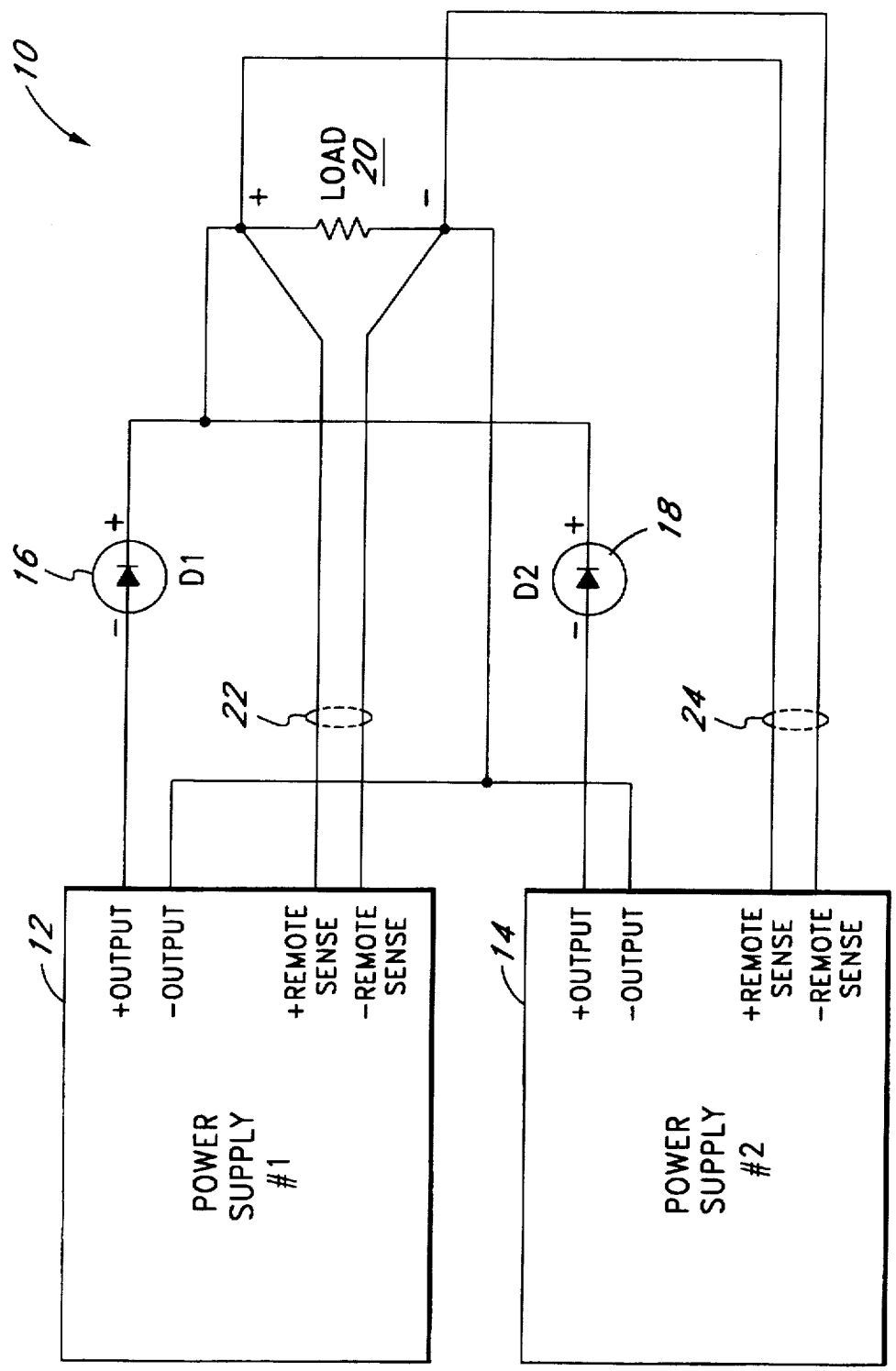
FIG. 1 is a block diagram of the redundant power supply system of the prior art.
Figure 2:
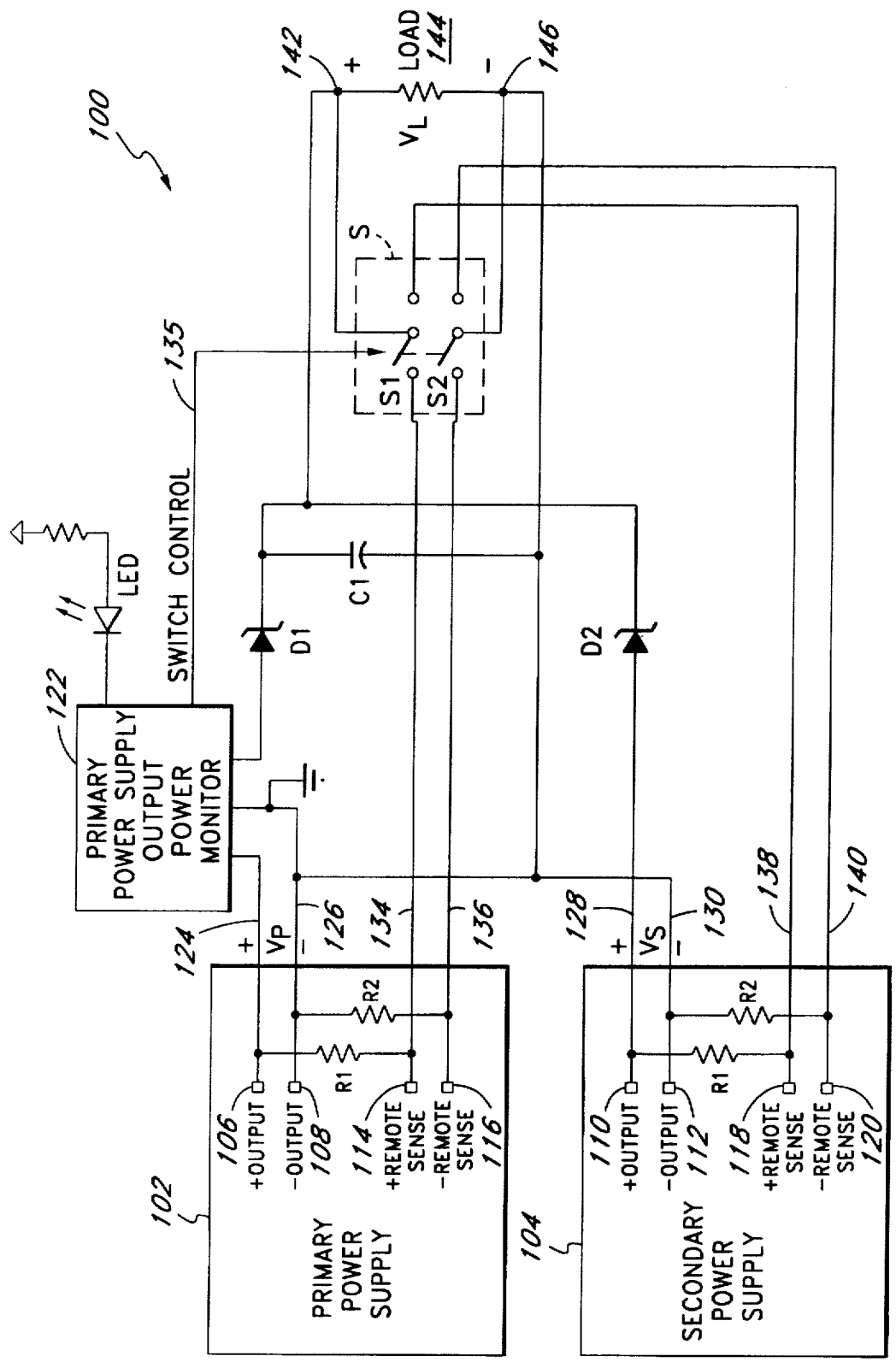
FIG. 2 is a block diagram of the redundant power supply system in accordance with the teachings of the present invention.

FIG. 2 is a block diagram of a power supply system 100 in accordance with the teachings of the present invention. For use in an in-flight entertainment system, the system 100 has the following characteristics: 306 Watts, a switching time of 60 milliseconds and a maximum current of 60 amps. The power supply system 100 comprises a primary power supply 102 and a secondary power supply 104 which are both energized during the normal operating mode. One embodiment uses two ASTEC AM80A-300L-050F40 power supply modules for power supply 102 and 104, although other similar power supply modules can be used by one of ordinary skill in the art. Each power supply 102 and 104 preferably has a positive and negative output terminal 106, 108 and 110, 112 respectively. In addition, each power supply 102 and 104 preferably has a positive and a negative remote sense terminal 114, 116 and 118, 120 respectively. The positive output terminal 106, 110 of each power supply 102 and 104 is coupled to the positive remote sense terminal 114, 116 of the respective power supply 102 and 104 through a resistor R1. Likewise, the negative output terminal 108, 112 of each power supply 102 and 104 respectively, is coupled to the negative remote sense terminal 116, 120 via a resistor R2.

The primary power supply 102 provides an output voltage $V_p$ via signal lines 124 and 126, while the secondary or backup power supply 104 provides an output voltage $V_S$ via signal lines 128 and 130. The output terminals 108 and 112 are coupled together, to a common ground. In addition, a monitor 122 is coupled to the output terminals 106 and 108 via signal lines 124 and 126 of the primary power supply 102. The monitor measures and monitors the supply voltage and current provided by primary power supply 102 for controlling a switch S and for providing status and other monitoring purposes. One embodiment uses two solid state switches, Maxim MAX323, for switch S. A diode D1 is coupled to the primary power supply 102 via the monitor 122, while another diode D2 is coupled directly to the secondary power supply 104. In one embodiment, the diode D1 and D2 are Schottky OR'ing diodes. A typical example of such diodes are those manufactured by International Rectifier under the part designation 95HQ015. The maximum voltage drop that occurs during the finite switchover time is equal to the forward voltage drops across the OR'ing diodes. For this reason, Schottky diodes, with low forward voltage drops, are used for the system 100, which is a 5V output power system. For higher output voltage applications, where the diode forward voltage drop is a smaller percentage of the output voltage, any rectifier diode with suitable current rating and working voltage rating is acceptable. The diodes D1 and D2 are OR'ed together to provide supply voltage to load 144 at the positive terminal 142 of the load 144. The negative terminal 146 of the load 144 is coupled to ground, as well as to the output terminals 108 and 112 of the primary and secondary power supplies 102 and 104 respectively A capacitor, C1, is coupled in parallel with the load 144.

Specifically, the positive and negative output terminals 106 and 108 of the primary power supply 102 is connected to a voltage and current monitor 122 via signal lines 124 and 126 respectively. The monitor 122 is in turn coupled to the anode of a diode D1. The cathode of diode D1 is coupled to the positive terminal 142 of a load 144. The positive remote sense terminal 114 is connected to the positive terminal 142 of the load 144 via switch S1, which is part of a latchable double throw double pole switch S, while the negative remote sense terminal 116 of the primary power supply 102 is connected to the negative terminal 146 of the load 144 via switch S2, which is also part of the switch S. Control of the switch S is provided by the monitor 122 via signal line 135, in response to the voltage and current measurements monitored at the output of the primary power supply 102.

On the secondary power supply 104, the positive output terminal 110 is directly coupled to the positive terminal 142 of the load 144 via diode D2. In particular, the cathode of the diode D2 is coupled to the positive terminal of the load 144. The negative output terminal 112 is coupled to the monitor 122 as well as the negative terminal 142 of the load 144. The output terminal 108 and output terminal 112 are coupled together and connected to the ground terminal of the monitor 122.

The power supply system 100 of the present invention can operate in one of two modes: (1) the normal mode, in which the primary power supply 102 provides the majority of the power to the load 144; and (2) the backup mode, in which the secondary power supply 104 provides the majority of the power to the load 13. These two modes are sufficient because the mean time between failures in in-flight entertainment systems is greater or equal to 53 hours. Moreover, in-flight entertainment systems are non-vital systems as compared to navigational systems and the like. The power supply system 100 will operate in the normal mode unless the voltage and current monitor 122 detects a fault with the primary power supply 102. In particular, a fault is detected if the primary power supply 102 does not maintain a minimum level of output power and/or current. In one embodiment, the monitor 122 is implemented using a "Power Good" status feature which is an integral part of primary power supply 102. This power supply monitor 122 will indicate a power supply failure if the primary power supply 102 ceases to generate an internally regulated voltage between 3.9 and 6.1 volts at either of its two internal inversion transformer secondaries (not shown). Once a fault has been detected, the monitor 122 issues a signal to the switch S via signal line 135 to change from a closed to an open state, to place the power supply system 100 in the backup mode.

The power supply system 100 will operate in either the normal or backup mode based on whether the primary power supply 102 is operating in the "remote sense" configuration while the secondary power supply 104 is operating in the "local sense" configuration; or if the primary power supply 102 is operating in the "local sense" configuration while the secondary power supply 104 is operating in the "remote sense" configuration. In the "local sense" configuration, the output terminals 106 and 108, or 110 and 112 on the primary power supply 102 or the secondary power supply 104 respectively, are connected to the load 144. In the "local sense" configuration, the power supply 102 or 104 will regulate the output voltage at the power supply output terminals 106 and 108 or 110 and 112. In the "remote sense" configuration, the remote sense terminals 114 and 116, or 118 and 120 on the primary power supply 102 or the secondary power supply 104 respectively, are connected to the load 144. In this configuration, the remote sense terminals 114 and 116 of the primary power supply 102 or the remote sense terminals 118 and 120 of the secondary power supply 104 are connected to the load, so that either the primary power supply 102 or the secondary power supply 104 will regulate the output voltage at the load 144.

Thus, at any particular time, either the primary power supply 102 or the secondary power supply 104 is coupled to the load 144 in the "local sense" configuration. At the same time, either the secondary power supply 104 or the primary power supply 102 is correspondingly coupled to the load 144 in the "remote sense" configuration. In the "remote sense" configuration, the output voltage of the power supply (102 or 104) is greater than that provided when the power supply (102 or 104) is in the "local sense" configuration. This is because in the "remote sense" configuration, the output voltage $V_L$ is the set point plus the Schottky diode D1 or D2 voltage drop, approximately 0.25V, whereas in the "local sense" configuration, the output voltage $V_L$ is the set point, only. As a result, when the power supply (102 or 104) is in the "remote sense" configuration, it will deliver nearly all of the current to the load given the voltage versus current relationship of the OR'ing diodes D1 and D2.

In an exemplary power supply system 100 for an in-flight entertainment system, the output voltage set points for power supply modules 102 and 104 are set to 5.1V. This is purposely done to provide additional headroom to ensure the voltage drop that occurs during switchover does not bring the logic power supply voltage out of the allowable 5% voltage tolerance range. Other tolerance ranges, could of course, be chosen according to need.

In operation, the monitor 122 monitors the supply voltage and current of primary module 102. Upon detection of normal operating conditions, the monitor directs switch S to close, thereby connecting the remote sense terminals 114 and 116 of the primary power supply 102 to load 144. This results in connecting the primary power supply 102 to the load 144 in the "remote sense" configuration. The remote sense terminals 118 and 120 of the secondary power supply 104 are disconnected from load 144. The secondary power supply 104 is accordingly arranged to operate in the "local sense" configuration. As a result, the output voltage $V_p$ at the output terminal 124 of the primary power supply 102 is higher than the voltage output $V_S$ at the output terminal 110 of the secondary power supply 104. Because its output voltage $V_p$ is higher, the primary power supply 102 will deliver nearly all of the current to the load 144 given the voltage $V_S$ current relationship of diodes 142 and 144. Thus, in the normal operating mode, the secondary power supply 104 will be placed in a greatly reduced state so that the operational stress on the secondary power supply 104 will be significantly reduced. As a result, the reliability of the secondary power supply 104 will be preserved.

When the primary power supply 102 fails, the monitor 122 detects the failure through a reduce supply voltage $V_p$ at the output terminal of the primary power supply 102. In response, the monitor 122 generates a control signal via signal line 135 to switch S, directing the switch S to connect remote sense terminals 118 and 120 of the secondary power supply 104 to load 144. As shown in FIG. 3, the switchover time $t_S$ is very short and causes no significant problem to the system 100 power supply. For applications in in-flight entertainment systems, the switchover period (i.e. the period between $t_R$ and $t_S$), $t_{RS}$, where $t_{RS}=0$ is preferable, and values of $t_{RS}<1_S$ are acceptable. Just prior to the switchover, i.e., prior to $t_R$, the primary power supply 102 is connected to the load 144 in the "remote sense" configuration while the secondary power supply 104 is connected to load 144 in the "local sense" configuration. In this configuration, the primary power supply 102 output voltage $V_p$, measured between signal lines 124 and 126, is approximately 5.35V, which is the regulated load voltage of 5.1V plus the diode drop across D1, which is approximately 0.25V. The output voltage $V_S$ of the secondary power supply 104, measured between signal lines 128 and 130, is approximately 5.1V, which is the set point voltage of the secondary power supply 104.

At time $t_R$, when the primary power supply 102 fails abruptly, the output current supplied by secondary power supply 104 begins to increase at the maximum transition rate. Capacitor C1 provides stored energy to the load during the 300 μs needed for power supply 104 to recover from the load transient of going from nearly no load to a fully loaded output condition. At time $t_R$, power supply 104 has recovered from the load transient, but switch S has not yet changed state. At this point, power supply 104 is still in the "local sense" mode and the load voltage $V_L$ is approximately 4.85V which is equal to the difference of the 5.1V set point voltage $V_S$ of power supply 104 minus the diode drop across D2 (approximately 0.25V). This 4.85V output voltage is compliant with the allowable 5% power supply tolerance for 5V logic device families. As previously discussed, other similar or equivalent logic devices may be used. Once the failed condition of power supply 102 has been detected, switch S changes to place power supply 104 in the "remote sense" operation mode at time $t_S$. Commencing at $t_S$, the load voltage $V_L$ begins to rise to the set point of power supply 104, i.e., 5.1V (at $t_E$). This 5.1V output is compliant with the allowable 5% power supply tolerance for 5V logic device families. The switchover time from $t_R$ to $t_E$ is typically less than a 1 ms duration. Upon failure of the primary power supply 102, the monitor 122 may generate an alarm or activate a light emitting diode (LED) to notify operational personnel that the primary power supply 102 should be replaced at the next maintenance period.

Referring to FIG. 4, a flow diagram illustrating a process S400 for switching the redundant power supplies is shown.

Upon START, the process S400 enters step S410. In step S410, the primary power and supply and the secondary power supply are both energized. The primary power supply provides most of, or a majority of the required power to the load while the secondary power supply provides minimal power to the load. Then the process S400 enters step S420. In step S420, the monitor circuit monitors the supply voltage of the primary power supply.

The process S400 then enters the decision step S430 to determine if the operating conditions are normal. If the operating condition is normal, the process S400 enters step S440. In step S440, the primary power supply is connected to the load and operates in the remote sense mode. Then the process S400 enters step S445. In step S445, the secondary power supply is disconnected from the load and operates in a local sense mode. The process S400 then returns back to step S420 to continue monitoring the primary power supply.

If the operating condition is not normal at the decision step S430, the process S400 enters step S450. In step S450, the secondary power supply is switched to the load, operating in the remote sense mode. The process S400 then enters step S455 to generate an alarm or a status indicator such as a LED. The process S400 is then terminated.

Through the implementation of the principles of the present invention, the reliability and operational life of a power supply system having a redundant power supply will be extended. In addition, the power supply system 100 will not have a single point failure since the secondary power supply will proceed to operate upon the failure of the primary power supply. Finally, the power supply system 100 of the present invention provides a remotely regulated redundant power converter in a very short period of time, while ensuring that power supply voltage fluctuations are within the operating range of the load during the switchover period.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A power supply system for an in-flight entertainment system, that supplies power to a load, comprising:
    a first power supply and a second power supply each having a first output terminal and a second output terminal, said first power supply delivering a majority portion of required power to the load when functional, said first power supply operating in one of a remote sense mode and a local sense mode;
    a monitor coupled to the first output terminal of said first power supply, said monitor for monitoring a supply voltage of said first power supply, said monitor generating a first signal and a second signal according to an operational condition of said first power supply;
    a first diode and a second diode, each having a first terminal and a second terminal, the first terminal of said first diode being coupled to said monitor, the second terminal of said first diode being coupled to a load, the first terminal of said second diode being coupled to the first output terminal of said second power supply, the second terminal of said second diode being coupled to the load;
    a switch coupled to said monitor, said switch having a first position for coupling said second output terminal of said first power supply to the load in response to the first signal from said monitor, said switch having a second position for coupling said second output terminal of said second power supply to the load in response to the second signal from said monitor; and
    a charging element coupled across the load for storing energy from the first power supply, said charging element providing stored energy to the load when the load is switched from the first power supply to the second power supply.

2. The power supply system of claim 1, wherein said first power supply provides power to the load through the second output terminal of said first power supply when said switch is in said first position.

3. The power supply system of claim 2, wherein said second power supply is energized but provides minimal power to the load through the first output terminal of said second power supply when said switch is in said first position.

4. The power supply system of claim 1, wherein said first signal from said monitor is generated when said first power supply is functional.

5. The power supply system of claim 1, wherein said second signal from said monitor is generated when said first power supply malfunctions.

6. The power supply system of claim 1, wherein said second power supply provides power to the load through the second output terminal of said second power supply when said switch is in said second position.

7. The power supply system of claim 1, wherein the first output terminals of said first power supply and said second power supply each comprises a positive output terminal and a negative output terminal, and wherein the load has a first terminal and a second terminal; and
    the first positive output terminal of said first power supply being coupled to said monitor, the negative output terminals of said first power supply and said second power supply being coupled together and to the negative terminal of said load, the negative terminal of said load also being coupled to a ground terminal, the positive terminal of said second power supply being coupled to the first end of said second diode, the second end of said first diode and the second end of said second diode being coupled to the positive terminal of said load.

8. The power supply system of claim 7, wherein the second output terminal of said first power supply and the second output terminal of said second power supply each comprises a positive output terminal and a negative output terminal, and wherein said switch comprises a first switch and a second switch, said first switch being coupled to the positive terminal of the load and said second switch being coupled to the negative terminal of the load; and
    the positive and the negative terminals of said first power supply being coupled to said first switch and said second switch respectively when said switch is in said first position, and the positive and the negative terminals of said second power supply being coupled to said first switch and said second switch respectively when said switch is in said second position.

9. The power supply system of claim 1, wherein said switch is a double throw, double pole switch.

10. The power supply system of claim 1, further comprising a light emitting diode coupled to said monitor, said light emitting diode emitting light when said monitor generates said second signal.

11. A method of providing power to a load, comprising the steps of:
    providing a first power supply and a second power supply;
    energizing said first power supply and said second power supply;
    operating the first power supply in one of a remote sense mode and a local sense mode;
    monitoring a supply voltage of said first power supply;
    delivering a majority portion of required power to the load from the first power supply if the supply voltage of the first power supply is above a predetermined level;
    switching delivery of power to the load from the first power supply to the second power supply if the supply voltage of the first power supply is below the predetermined level;
    storing energy from the first power supply in a charging element; and
    providing energy stored in the charging element to the load when the load is switched from the first power supply to the second power supply.

12. The method of claim 11, further comprising the step of providing a switch, wherein power is provided from the first power supply when said switch is in a first position in response to a first signal from the monitor, and wherein power is provided from the second power supply when said switch is in a second position in response to a second signal from the monitor.

13. The method of claim 12, wherein said first signal from said monitor is generated when the supply voltage of said first power supply is above the predetermined level.

14. The method of claim 12, wherein said second signal from said monitor is generated when the supply voltage of said first power supply is below the predetermined level.

15. The method of claim 11, further comprising the step of generating a signal indicating that the supply voltage of the first power supply is below the predetermined level, after said switching step.

16. The method of claim 11, wherein in the step of delivering power to a load includes the step of delivering minimal power to the load from the second power supply.

17. A method of providing power to a load, comprising the steps of:

provided a first power supply and a second power supply each having a first output terminal and a second output terminal, said first power supply delivering a majority portion of required power to the load when functional;

operating said first power supply in one of a remote sense mode and a local sense mode;

coupling a monitor to the first output terminal of said first power supply;

coupling a first terminal of a first diode to said monitor, and coupling a second terminal of said first diode to a load;

coupling a first terminal of a second diode to the first output terminal of said second power supply, and coupling a second terminal of said second diode to the load;

coupling a switch to said monitor, said switch having a first position for coupling said second output terminal of said first power supply to the load, said switch having a second position for coupling said second output terminal of said second power supply to the load;

monitoring a supply voltage of the first power supply;

storing energy from the first power supply in a charging element; and providing energy stored in the charging element to the load when the load is switched from the first power supply to the second power supply;

coupling said switch to the first position if the supply voltage is above a predetermined level; and coupling said switch to the second position if the supply voltage is below a predetermined level.

18. The method of claim 17, further comprising the step of delivering power solely from said first power supply to the load through the second output terminal of said first power supply when said switch is in said first position.

19. The method of claim 18, further comprising the step of energizing said second power supply when said switch is in said first position.

20. The method of claim 17, wherein in the step of coupling said switch to the first position, said predetermined level is a voltage level indicating that said first power supply is functional.

21. A power supply system for an in-flight entertainment system, that supplies power to a load, comprising:

first means and second means for supplying power, each having a first output terminal and a second output terminal, said first means delivering a majority portion of required power to the load when functional, said first means operating in one of a remote sense mode and a local sense mode;

monitor means coupled to the first output terminal of said first means, said monitor means for monitoring the supply voltage of said first means, said monitor means generating a first signal and a second signal according to an operational condition of said first power supply;

first diode means and second diode means, each having a first terminal and a second terminal, the first terminal of said first diode means being coupled to said monitor means, the second terminal of said first diode means being coupled to a load, the first terminal of said second diode means being coupled to the first output terminal of said second means, the second terminal of said second diode means being coupled to the load;

switch means coupled to said monitor means, said switch means having a first position for coupling said second output terminal of said first means to the load in response to a first signal from said monitor means, said switch means having a second position for coupling said second output terminal of said second means to the load in response to a second signal from said monitor means; and charging means coupled across the load for storing energy from the first power supply, said charging means providing stored energy to the load when the load is switched from the first power supply to the second power supply.

22. The power supply system of claim 21, wherein said first means provides power to the load through the second output terminal of said first means when said switch means is in said first position.

23. The power supply system of claim 22, wherein said second means is energized but provides minimal power to the load through the first output terminal of said second means when said switch is in said first position.

24. The power supply system of claim 21, wherein said first signal from said monitor means is generated when said first means is functional.

25. The power supply system of claim 21, wherein said second signal from said monitor means is generated when said first means malfunctions.

26. The power supply system of claim 21, wherein said second means provides power to the load through the second output terminal of said second means when said switch means is in said second position.

27. The power supply system of claim 21, wherein the first output terminals of said first means and said second means each comprises a positive output terminal and a negative output terminal, and wherein the load has a first terminal and a second terminal; and the first positive output terminal of said first means being coupled to said monitor means, the negative output terminals of said first means and said second means being coupled together and to the negative terminal of said load, the negative terminal of said load also being coupled to a ground terminal, the positive terminal of said second means being coupled to the first end of said second diode means, the second end of said first diode means and the second end of said second diode means being coupled to the positive terminal of said load.

28. The power supply system of claim 27, wherein the second output terminal of said first means and the second output terminal of said second means each comprises a positive output terminal and a negative output terminal, and wherein said switch means comprises a first switch and a second switch, said first switch being coupled to the positive terminal of the load and said second switch being coupled to the negative terminal of the load; and the positive and the negative terminals of said first means being coupled to said first switch and said second switch respectively when said switch means is in said first position, and the positive and the negative terminals of said second means being coupled to said first switch and said second switch respectively when said switch means is in said second position.

29. The power supply system of claim 1, wherein said switch means is a double throw, double pole switch.

30. The power supply system of claim 1, further comprising a light emitting diode coupled to said monitor means, said light emitting diode emitting light when said monitor means generates said second signal.

* * * * *

UNITED STATES PATENT AND TRADEMARK OFFICE
CERTIFICATE OF CORRECTION

PATENT NO. : 5,894,413
DATED : April 13, 1999
INVENTOR(S) : Bruce R. Ferguson

It is certified that error appears in the above-identified patent and that said Letters Patent is hereby corrected as shown below:

In column 3 at line 66 insert --.-- after "respectively"

Signed and Sealed this

Twenty-eighth Day of December, 1999

Attest:

Q. TODD DICKINSON

Attesting Officer      Acting Commissioner of Patents and Trademarks